United States Patent
Sun et al.

(10) Patent No.: US 9,632,888 B2
(45) Date of Patent: Apr. 25, 2017

(54) MEMORY DATA MIGRATION METHOD AND APPARATUS, AND COMPUTER

(71) Applicant: HUAWEI TECHNOLOGIES CO., LTD., Shenzhen, Guangdong (CN)

(72) Inventors: Hongwei Sun, Hangzhou (CN); Limei Shen, Hangzhou (CN); Teng Lv, Shenzhen (CN); Dixuan Zhang, Hangzhou (CN); Liping Yang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/058,100

(22) Filed: Mar. 1, 2016

(65) Prior Publication Data
US 2016/0179643 A1    Jun. 23, 2016

Related U.S. Application Data

(63) Continuation of application No. PCT/CN2013/087645, filed on Nov. 22, 2013.

(51) Int. Cl.
*G06F 11/00* (2006.01)
*G06F 11/20* (2006.01)
(Continued)

(52) U.S. Cl.
CPC .......... *G06F 11/2058* (2013.01); *G06F 3/065* (2013.01); *G06F 3/0619* (2013.01);
(Continued)

(58) Field of Classification Search
CPC ............. G06F 11/1466; G06F 11/1461; G06F 11/1458; G06F 11/2058; G06F 11/14;
(Continued)

(56) References Cited

U.S. PATENT DOCUMENTS 5,212,784 A * 5/1993 Sparks ................ G06F 11/1456
714/6.12
5,680,539 A * 10/1997 Jones .................. G06F 11/1435
711/114
(Continued)

FOREIGN PATENT DOCUMENTS

CN    102326149 A    1/2012
CN    102662723 A    9/2012
(Continued)

OTHER PUBLICATIONS

Kaye Eshghi et al, A Framework for Analyzing and Improving Content-Based Chunked Algorithm, Sep. 22, 2005, total 11 pages.
(Continued)

*Primary Examiner* — Marc Duncan
(74) *Attorney, Agent, or Firm* — Huawei Technologies Co., Ltd.

(57) ABSTRACT

Embodiments of the present invention provide a memory data migration method and apparatus, and a computer, to migrate memory data that is in the computer. After acquiring a first trigger instruction, an operating system of the computer can suspend a task that is being executed, to execute memory data migration, determine a source memory card that stores to-be-migrated memory data, determine a backup memory card for the source memory card, and instruct a memory controller associated with the source memory card to perform the memory data migration, so that the memory controller associated with the source memory card reads memory data of the source memory card according to an instruction of the operating system, and writes the read memory data of the source memory card into the backup memory card.

19 Claims, 5 Drawing Sheets

(51) Int. Cl.
*G06F 11/14* (2006.01)
*G06F 11/16* (2006.01)
*G06F 3/06* (2006.01)
*G06F 13/00* (2006.01)

(52) U.S. Cl.
CPC .......... *G06F 3/0665* (2013.01); *G06F 3/0685* (2013.01); *G06F 11/14* (2013.01); *G06F 11/1461* (2013.01); *G06F 11/1658* (2013.01); *G06F 11/1662* (2013.01); *G06F 11/1666* (2013.01); *G06F 11/2056* (2013.01); *G06F 11/2069* (2013.01); *G06F 11/2094* (2013.01); *G06F 13/00* (2013.01); *G06F 11/20* (2013.01); *G06F 2201/84* (2013.01)

(58) Field of Classification Search
CPC ............. G06F 11/1658; G06F 11/1662; G06F 11/1666; G06F 11/2056; G06F 11/2069; G06F 11/2094; G06F 3/0619; G06F 3/0647; G06F 3/065; G06F 3/0665; G06F 3/0685; G06F 2201/84
See application file for complete search history.

(56) References Cited

U.S. PATENT DOCUMENTS

| | | | |
|---|---|---|---|
| 5,941,993 A * | 8/1999 | Tanaka | G06F 11/1084 714/6.12 |
| 5,990,810 A | 11/1999 | Williams | |
| 6,453,408 B1 | 9/2002 | Stuart Fiske et al. | |
| 6,487,623 B1 * | 11/2002 | Emerson | G06F 13/4081 710/302 |
| 6,816,986 B1 * | 11/2004 | Fanning | G11C 29/76 714/42 |
| 7,139,942 B2 * | 11/2006 | Subramanian | G06F 11/1666 714/41 |
| 7,552,152 B2 * | 6/2009 | Richards | G06F 3/0605 |
| 7,765,553 B2 * | 7/2010 | Douceur | G06F 9/4881 718/102 |
| 8,219,851 B2 * | 7/2012 | Swanson | G06F 11/073 714/6.1 |
| 9,424,146 B2 * | 8/2016 | Yang | G06F 11/14 |
| 2002/0010875 A1 * | 1/2002 | Johnson | G06F 11/108 714/5.1 |
| 2002/0042893 A1 * | 4/2002 | Larson | G06F 11/1044 714/5.1 |
| 2003/0208650 A1 * | 11/2003 | Depew | G06F 11/1658 710/302 |
| 2008/0155218 A1 | 6/2008 | Elliott et al. | |
| 2008/0162797 A1 | 7/2008 | Teicher et al. | |
| 2009/0150721 A1 * | 6/2009 | Kochar | G06F 11/1008 714/6.11 |
| 2009/0222640 A1 | 9/2009 | Bauman et al. | |
| 2012/0260266 A1 * | 10/2012 | Tomii | G06F 3/0607 719/327 |
| 2013/0041977 A1 | 2/2013 | Wakamiya | |
| 2014/0052948 A1 | 2/2014 | Qiu et al. | |
| 2015/0074367 A1 * | 3/2015 | Cher | G06F 11/008 711/165 |
| 2015/0242154 A1 * | 8/2015 | Yang | G06F 11/14 711/115 |

FOREIGN PATENT DOCUMENTS

| | | |
|---|---|---|
| CN | 103198028 A | 7/2013 |
| EP | 2664990 A1 | 11/2013 |

OTHER PUBLICATIONS

Athicha Muthitacharoen et al., A Low-bandwidth Network File System, 2001, total 14 pages.
Dutch T. Meyer et al, A Study of Practical Deduplication, 2012, total 13 pages.
Guanlin Lu, An Efficient Data Deduplication Design with Flash Memory Based SSD, Jan. 2012, total 116 pages.
Erik Kruus et al, Bimodal Content Defined Chunking for Backup Streams, 2010, total 14 pages.
Ahmed Ei-Shimi et al, Primary Data Deduplication—Large Scale Study and System Design, 2012, total 12 pages.

* cited by examiner

MEMORY DATA MIGRATION METHOD AND APPARATUS, AND COMPUTER

CROSS-REFERENCE TO RELATED APPLICATIONS

This application is a continuation of International Application No. PCT/CN2013/087645, filed on Nov. 22, 2013, which is hereby incorporated by reference in its entirety.

TECHNICAL FIELD

The present invention relates to computer technologies, and in particular, to a memory data migration method and apparatus, and a computer.

BACKGROUND

A memory (Memory), also referred to as a primary memory, is one of important parts in a computer. Because all programs of a computer run in a memory, performance of the memory greatly affects the computer. The memory can be configured to temporarily store computational data of a processor and data exchanged with an external memory such as a hard disk. Provided that the computer is running, the processor transfers data that needs to be computed to the memory for computation, and when the computation is complete, the processor then transmits a result, so that running of the memory also determines stable running of the computer.

In an X86 architecture, a quantity of memories supported by a server is growing, and in terms of a latest Intel E7 V2 processor, a single processor may support a maximum of two memory risers, and each memory riser may support a maximum of 12 memory modules, and therefore, a quantity of memory modules in an 8P system may reach 192. However, a memory fault rate in an existing system may be up to 0.1%, and a memory fault may not only cause unstable running of the system, but also cause a crash of the system.

In the prior art, migration of memory data in a computer cannot be implemented, so that when a memory fault occurs in a system, data in a faulty memory riser or a faulty memory module cannot be migrated with the computer running normally, and consequently, online maintenance cannot be performed on a faulty memory, and the faulty memory riser or the faulty memory module can be replaced only after the computer is powered off.

SUMMARY

Embodiments of the present invention provide a memory data migration method and apparatus, and a computer, according to which memory data migration can be performed without powering off of the computer.

According to a first aspect, an embodiment of the present invention provides a computer, where the computer includes:

a processor;

a primary memory, configured to load an instruction of an operating system of the computer, where the primary memory includes one or more memory cards; and a memory controller, where each memory card is provided with a corresponding memory controller; where the operating system is configured to acquire a first trigger instruction, suspend, according to the first trigger instruction, a task that is being executed, determine a source memory card that stores to-be-migrated memory data, determine a backup memory card for the source memory card, and instruct a memory controller associated with the source memory card to perform memory data migration; and the memory controller associated with the source memory card is configured to migrate memory data of the source memory card to the backup memory card according to an instruction of the operating system.

With reference to the first aspect, in a first possible implementation manner, the operating system is specifically configured to set a mirror mode between the source memory card and the backup memory card; send a data read instruction to the memory controller associated with the source memory card, where the data read instruction is used to instruct the memory controller associated with the source memory card to read the memory data of the source memory card; and send a data write instruction to the memory controller associated with the source memory card, where the data write instruction is used to instruct the memory controller associated with the source memory card to write the read data back to the source memory card; the memory controller associated with the source memory card is specifically configured to read the memory data of the source memory card according to the data read instruction of the operating system, receive the data write instruction sent by the operating system, and send the read memory data of the source memory card to a memory controller associated with the backup memory card according to the mirror mode between the source memory card and the backup memory card; and the memory controller associated with the backup memory card is configured to write the received memory data of the source memory card into the backup memory card.

With reference to the first possible implementation manner of the first aspect, in a second possible implementation manner, the operating system is specifically configured to acquire a multiple migration policy, and instruct, according to the multiple migration policy, the memory controller associated with the source memory card to perform the memory data migration in multiple times.

With reference to the second possible implementation manner of the first aspect, in a third possible implementation manner, the operating system is specifically configured to cyclically execute, according to the multiple migration policy, the following operations a) to d), until all the memory data of the source memory card is migrated to the backup memory card, and the operations a) to d) include: a) determining a volume of data for current migration, and instructing the memory controller associated with the source memory card to migrate data of the volume for the current migration to the backup memory card; or determining duration of current migration, and instructing the memory controller associated with the source memory card to perform the memory data migration during the duration of the current migration; b) after it is determined that the memory controller associated with the source memory card has completed the current migration, suspending execution of the memory data migration; c) receiving a second trigger instruction, where the second trigger instruction is used to instruct the operating system to continue to perform the memory data migration; and d) returning to execute step a), until all the memory data of the source memory card is migrated to the backup memory card.

With reference to the first aspect, or the first possible implementation manner, the second possible implementation manner, or the third possible implementation manner of the first aspect, in a fourth possible implementation manner, the operating system is further configured to change a target memory card to which a system address of the source memory card points, to the backup memory card after it is determined that all the memory data of the source memory card is migrated to the backup memory card.

According to a second aspect, an embodiment of the present invention provides a memory data migration method, used to migrate memory data that is in a computer, where the method includes:

acquiring, by an operating system of the computer, a first trigger instruction, where the first trigger instruction is used to instruct the operating system to execute memory data migration;

suspending, by the operating system, a task that is being executed, to start up the memory data migration;

determining, by the operating system, a source memory card that stores to-be-migrated memory data;

determining, by the operating system, a backup memory card for the source memory card; and instructing, by the operating system, a memory controller associated with the source memory card to perform the memory data migration, so that the memory controller associated with the source memory card migrates memory data of the source memory card to the backup memory card according to an instruction of the operating system.

With reference to the second aspect, in a first possible implementation manner, the method further includes: setting, by the operating system, a mirror mode between the source memory card and the backup memory card; where the instructing, by the operating system, the memory controller associated with the source memory card to perform the memory data migration, so that the memory controller associated with the source memory card reads the memory data of the source memory card according to an instruction of the operating system, and writes the read memory data of the source memory card into the backup memory card includes:

sending, by the operating system, a data read instruction to the memory controller associated with the source memory card, where the data read instruction is used to instruct the memory controller associated with the source memory card to read the memory data of the source memory card;

reading, by the memory controller associated with the source memory card, the memory data of the source memory card according to the data read instruction of the operating system;

sending, by the operating system, a data write instruction to the memory controller associated with the source memory card, where the data write instruction is used to instruct the memory controller associated with the source memory card to write the read data back to the source memory card; and receiving, by the memory controller associated with the source memory card, the data write instruction sent by the operating system, and sending the read memory data of the source memory card to a memory controller associated with the backup memory card according to the mirror mode between the source memory card and the backup memory card, so that the memory controller associated with the backup memory card writes the received memory data of the source memory card into the backup memory card.

With reference to the first possible implementation manner of the second aspect, in a second possible implementation manner, before the instructing, by the operating system, a memory controller associated with the source memory card to perform the memory data migration, the method further includes: acquiring, by the operating system, a multiple migration policy; and instructing, by the operating system according to the multiple migration policy, the memory controller associated with the source memory card to perform the memory data migration in multiple times.

With reference to the second possible implementation manner of the second aspect, in a third possible implementation manner, the instructing, by the operating system according to the multiple migration policy, the memory controller associated with the source memory card to perform the memory data migration in multiple times includes: a) determining, by the operating system, a volume of data for current migration, and instructing the memory controller associated with the source memory card to migrate data of the volume for the current migration to the backup memory card; or determining, by the operating system, duration of current migration, and instructing the memory controller associated with the source memory card to perform the memory data migration during the duration of the current migration; b) after it is determined that the memory controller associated with the source memory card has completed the current migration, suspending, by the operating system, execution of the memory data migration; c) receiving, by the operating system, a second trigger instruction, where the second trigger instruction is used to instruct the operating system to continue to perform the memory data migration; and d) returning, by the operating system, to execute step a), until all the memory data of the source memory card is migrated to the backup memory card.

With reference to the second aspect, or a first possible implementation manner, a second possible implementation manner, or a third possible implementation manner of the second aspect, in a fourth possible implementation manner, after all the memory data of the source memory card is migrated to the backup memory card, the method further includes: changing, by the operating system, a target memory card to which a system address of the source memory card points, to the backup memory card.

According to a third aspect, an embodiment of the present invention provides a memory data migration apparatus, configured to migrate memory data that is in a computer, where the apparatus includes:

an acquiring unit, configured to acquire a first trigger instruction, where the first trigger instruction is used to instruct an operating system to execute memory data migration;

a determining unit, configured to suspend, after the acquiring unit acquires the first trigger instruction, a task that is being executed, to start up the memory data migration; determine a source memory card that stores to-be-migrated memory data; and determine a backup memory card for the source memory card; and a migration unit, configured to instruct a memory controller associated with the source memory card to perform the memory data migration, so that the memory controller associated with the source memory card migrates memory data of the source memory card to the backup memory card according to an instruction of the operating system.

With reference to the third aspect, in a first possible implementation manner, the apparatus further includes: a mirroring unit, configured to set a mirror mode between the source memory card and the backup memory card, where the migration unit is specifically configured to: send a data read instruction to the memory controller associated with the source memory card, where the data read instruction is used to instruct the memory controller associated with the source memory card to read the memory data of the source memory card; and send a data write instruction to the memory controller associated with the source memory card, where the data write instruction is used to instruct the memory controller associated with the source memory card to write the read data back to the source memory card, so that the memory controller associated with the source memory card writes the read memory data of the source memory card into the backup memory card according to the mirror mode between the source memory card and the backup memory card.

With reference to the first possible implementation manner of the third aspect, in a second possible implementation manner, the migration unit is specifically configured to acquire a multiple migration policy, and instruct, according to the multiple migration policy, the memory controller associated with the source memory card to perform the memory data migration in multiple times.

With reference to the second possible implementation manner of the third aspect, in a third possible implementation manner, the migration unit is specifically configured to cyclically execute the following operations a) to d), until all the memory data of the source memory card is migrated to the backup memory card, and the operations a) to d) include: a) determining a volume of data for current migration, and instructing the memory controller associated with the source memory card to migrate data of the volume for the current migration to the backup memory card; or determining duration of current migration, and instructing the memory controller associated with the source memory card to perform the memory data migration during the duration of the current migration; b) after it is determined that the memory controller associated with the source memory card has completed the current migration, suspending execution of the memory data migration; c) receiving a second trigger instruction, where the second trigger instruction is used to instruct the operating system to continue to perform the memory data migration; and d) returning to execute step a), until all the memory data of the source memory card is migrated to the backup memory card.

With reference to the third aspect, or a first possible implementation manner, a second possible implementation manner, or a third possible implementation manner of the third aspect, in a fourth possible implementation manner, the migration unit is further configured to change a target memory card to which a system address of the source memory card points, to the backup memory card after it is determined that the memory controller associated with the source memory card has completed the memory data migration of the source memory card.

In the embodiments of the present invention, after acquiring a first trigger instruction, an operating system can suspend a task that is being executed, to execute memory data migration, determine a source memory card that stores to-be-migrated memory data, determine a backup memory card for the source memory card, and instruct a memory controller associated with the source memory card to read memory data of the source memory card and write the read memory data of the source memory card into the backup memory card. Therefore, the memory data of the source memory card can be migrated without powering off of a computer, thereby implementing online maintenance on a faulty memory card and resolving a problem in the prior art that a faulty memory card can be replaced or maintained only after an entire computer is powered off.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Embodiments of the present invention provide a memory data migration method, a computer, and a system, according to which memory data migration can be performed with the computer running normally.

Computer that Implements Memory Data Migration

Figure 1:
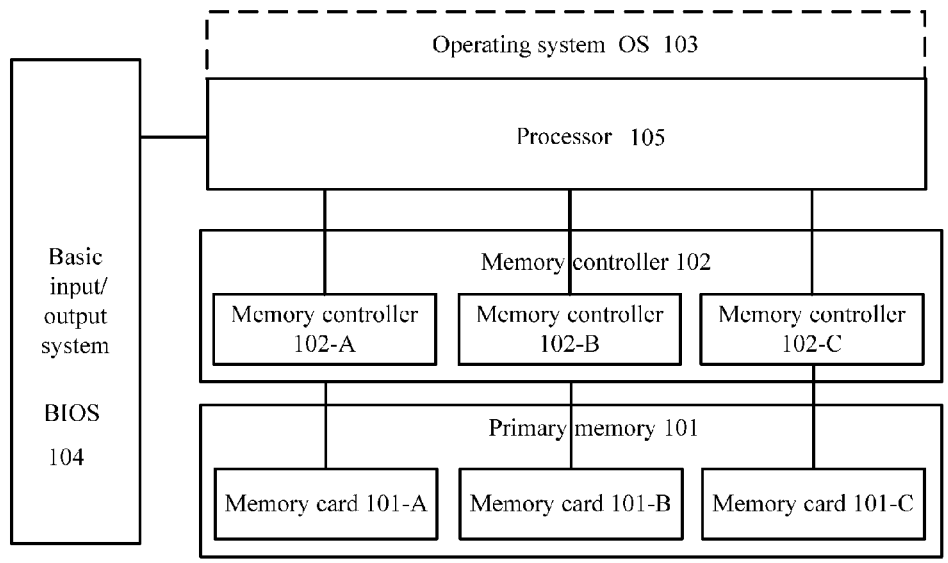
FIG. 1 is a system block diagram of a computer according to an embodiment of the present invention.

As shown in FIG. 1, FIG. 1 is an example of a computer implementing an embodiment of the present invention, where the computer includes a primary memory 101, a memory controller 102, a processor 105, a basic input/output system (BIOS) 104, and a hard disk (not shown in FIG. 1). The primary memory 101 includes at least one memory card, and in FIG. 1, three memory cards, that is, memory cards 101-A, 101-B, and 101-C are used as an example. The memory controller 102 is configured to control the primary memory 101, and each memory card of the primary memory 101 may be associated with a corresponding memory controller 102, for example, a memory controller 102-A is associated with the memory card 101-A, a memory controller 102-B is associated with the memory card 101-B, and a memory controller 102-C is associated with the memory card 101-C. The memory card of this embodiment may be specifically any storage medium that can be used as a memory, such as a memory riser or a memory module, and one memory card may refer to one memory module or one memory riser, or may refer to a set of multiple memory modules or a set of multiple memory risers. Each memory card is provided with a corresponding memory controller, a correspondence between a memory card and a memory controller may be one-to-one, or may be one-to-multiple or multiple-to-one, and FIG. 1 is only an implementation example of the present invention.

After a system of the computer is powered on, the primary memory 101 may load, when the computer is powered on and started up, an instruction that is in the BIOS 104 and an instruction of an operating system (OS) 103 of the computer that is stored in the hard disk, and the processor 105 may execute the instruction of the BIOS 104 or the instruction of the operating system (OS) 103 of the computer. For example, the processor 105 may execute the instruction of the BIOS 104 to initialize a device that is in the computer, and execute the instruction of the OS 103 to perform a read/write operation on the memory card, where the processor 105 mainly refers to a CPU core part, and may be one CPU core or a set of multiple CPU cores, and in this embodiment of the present invention, the processor 105 is a set of multiple CPU cores. The BIOS 104 may be a processing chip, multiple processing instructions are registered in the processing chip, and the processor 105 may execute these processing instructions.

In this embodiment, to implement memory data migration, a backup memory card needs to be provided in the computer, as a target memory card of migration of memory data of a source memory card, and in addition, a memory card on which the memory data migration is to be performed is referred to as a source memory card in this embodiment. In the embodiment shown in FIG. 1, the memory cards 101-A and 101-B may be source memory cards, and the memory card 101-C is a backup memory card provided in this embodiment of the present invention. In this embodiment, designating the backup memory card 101-C for the computer is used as an example, but in practice, multiple backup memory cards may be designated for the computer. An objective of the memory data migration described in this embodiment of the present invention is to enable the backup memory card to acquire memory data in a source memory card. To achieve the foregoing migration objective, in specific implementation, manners such as replicating, copying, or moving the memory data may be used, and provided that the migration objective that the backup memory card can acquire the memory data in the source memory card is achieved, the foregoing specific implementation manners all fall within the "migration" scope of this embodiment of the present invention.

In this embodiment of the present invention, functional improvement is performed on the OS 103 to implement that the memory data migration is performed without powering off of the computer. For example, the improved OS 103 may be enabled to acquire a first trigger instruction, and suspend, according to the first trigger instruction, a task that is being executed, to start up the memory data migration, for example, to determine a source memory card that stores to-be-migrated memory data, determine a backup memory card for the source memory card, and instruct a memory controller associated with the source memory card to perform the memory data migration, so that the memory controller associated with the source memory card can migrate memory data of the source memory card to the backup memory card according to an instruction of the OS 103.

Components of the computer in this embodiment of the present invention may execute the following operations:

The OS 103 is configured to acquire a first trigger instruction, suspend, according to the first trigger instruction, a task that is being executed, to start up memory data migration, determine a memory card that stores to-be-migrated data, such as the source memory card 101-A, determine a backup memory card for the source memory card, for example, determine the backup memory card 101-C for the source memory card 101-A, and instruct the memory controller 102-A of the source memory card to perform the memory data migration.

The memory controller 102-A of the source memory card is configured to read memory data of the source memory card 101-A according to an instruction of the OS 103, and write the read memory data of the source memory card 101-A into the backup memory card 101-C.

In this embodiment of the present invention, after acquiring a first trigger instruction, the OS 103 can suspend a task that is being executed, execute memory data migration, determine the source memory card 101-A that stores to-be-migrated memory data, determine the backup memory card 101-C for the source memory card, and instruct the memory controller 102-A of the source memory card to write memory data of the source memory card 101-A into the backup memory card 101-C. Therefore, the memory data of the source memory card 101-A can be migrated without powering off of the computer, thereby implementing online maintenance on a faulty memory card and resolving a problem in the prior art that a faulty memory card can be replaced or maintained only after an entire computer is powered off.

The following describes in detail functions of components in this embodiment of the present invention.

About Configuration of Backup Memory Card

In this embodiment, to ensure that the OS 103 performs memory data migration successfully, a backup memory card needs to be provided in the computer, where the backup memory card, as a target device of to-be-migrated memory data, differs from another memory card in the computer to some extent. For example, the backup memory card is invisible to the OS 103 before the memory data migration is completed, that is, the OS 103 cannot perform a read/write operation on the backup memory card; the processor 105 may execute an instruction of the BIOS 104 to perform special initialization on the backup memory card 101-C, so that the backup memory card 101-C is ready and can be used normally, but a process of the initialization avoids allocating a system address to the backup memory card 101-C, and therefore, the OS 103 cannot perform any read/write operation on the backup memory card 101-C, thereby ensuring that memory data of a source memory card is completely migrated to the backup memory card and avoiding damage to migrated memory data due to overwriting by using other data during a migration process.

Configuration of the backup memory card may include:

1. Designate and record an identifier of the backup memory card. After inserting the backup memory card into a hardware slot, a user may send the identifier of the backup memory card to the OS 103, and the OS 103 may acquire the identifier of the designated backup memory card and record the identifier of the designated backup memory card in a storage module. In this case, a memory card that already exists as hardware in the computer is designated as the backup memory card; or a user may not insert the backup memory card into a hardware slot, but designate a slot number of a hardware slot into which the backup memory card is subsequently inserted, and record the designated slot number as the identifier of the backup memory card. In this case, a memory card that does not exist as hardware yet in the computer is designated as the backup memory card.

After the identifier of the backup memory card is designated and recorded, the OS 103 may subsequently search for the recorded identifier of the backup memory card, to determine the backup memory card.

2. Execute the special initialization on the backup memory card. After the backup memory card is designated, the special initialization may be performed on the backup memory card, so that the backup memory card is ready, and the computer can write the memory data of the source memory card into the backup memory card. The initialization performed on the backup memory card requires that the memory card has been inserted into the hardware slot, but in practice, time when the backup memory card is inserted into the hardware slot may be very flexible: insertion may be performed before the backup memory card is designated, or may be performed at any time after the backup memory card is designated and before the memory data migration is executed. Specifically, initialization scenarios may be classified into three types: a first type is that the user presses a button on a backup memory card before the memory data migration is started up, where the button generates an initialization interrupt, to enable the computer to execute the BIOS 104 to perform the special initialization on the backup memory card; a second type is that before the memory data migration is started up and when the computer is powered on and started up, the user designates the backup memory card 101-C that is in the system by using a start menu of the BIOS 104, to enable the BIOS 104 to restart the computer, to perform a special initialization operation on the backup memory card 101-C; and a third type is that after the memory data migration is started up, the initialization performed on the backup memory card may be started up at the moment if the BIOS detects that the backup memory card has not been completely initialized.

Performing the special initialization on the backup memory card refers to configuring the backup memory card, so that the backup memory card is ready and can be used normally, but is invisible to the OS 103. The process of the initialization includes various behaviors of normal initialization, except avoiding allocating a system address to the backup memory card during the process of the initialization. For example, the initializing the backup memory card may include supplying power to the backup memory card, configuring parameters such as related performance, configuring a communication connection between the backup memory card and the processor of the computer, detecting whether the backup memory card can perform a normal read/write operation, and the like. When the backup memory card is being initialized, allocating a system address to the backup memory card is avoided, so that the OS 103 cannot acquire a system address of the backup memory card and cannot perform any read/write operation on the backup memory card, that is, although the backup memory card is ready, the backup memory card is invisible to the OS. In this case, the OS cannot use the backup memory card.

About Triggering Memory Data Migration

In this embodiment of the present invention, memory data migration is triggered and started up according to a fault situation of a source memory card or a user requirement. In other words, after the computer is powered on and started up, an instruction of the OS 103 is executed normally, a task that is being executed is suspended according to a received or generated memory data migration trigger instruction, and the memory data migration is started up. After acquiring the memory data migration trigger instruction, the OS 103 may immediately suspend the task that is being executed, to execute the memory data migration, or may suspend, when the computer is idle, the task that is being executed, to execute the memory data migration. For example, a user may pre-configure the OS 103, and configure the first trigger instruction to be a processing instruction with a highest priority, so that after acquiring the first trigger instruction, the OS 103 immediately suspends the task that is being executed, to execute the memory data migration, thereby ensuring that memory data of a faulty memory card is migrated in time. In this embodiment of the present invention, the OS 103 performs the memory data migration only when acquiring the memory data migration trigger instruction, that is, the memory data migration is performed on a source memory card designated by the user or a source memory card that has a definite fault. It is not required to pre-designate a fixed source memory card or pre-configure a mirror relationship between a source memory card and a backup memory card. Therefore, in this embodiment of the present invention, the memory data migration is triggered on a definite source memory card, thereby not only ensuring that a fault is rectified in time, but also saving computer resources, and ensuring high efficiency of the computer.

In this embodiment of the present invention, the memory data migration trigger instruction is used to instruct the OS 103 to suspend the task that is being executed, to start up the memory data migration. Because in this embodiment of the present invention, memory data may be migrated in one time, or the memory data may be migrated in multiple times, in this embodiment of the present invention, the memory data migration trigger instruction may include a first trigger instruction and a second trigger instruction, where a memory data migration trigger instruction that starts up the first time of migration of the memory data is referred to as the first trigger instruction, and a memory data migration trigger instruction that triggers subsequent migration of the memory data is referred to as a second trigger instruction.

In this embodiment of the present invention, the first trigger instruction is used to instruct the OS 103 to execute the memory data migration, where triggering of the first trigger instruction may be relatively flexible, and the triggering of the first trigger instruction may be relatively flexible. For example, the first trigger instruction may be generated according to a user instruction, or the first trigger instruction may be triggered by the memory controller 102-A of the source memory card. Specifically, for example:

(1) The memory controller 102-A of the source memory card may further monitor erroneous data of the source memory card, and trigger the first trigger instruction if a volume of the erroneous data exceeds a threshold; and the OS 103 determines, according to the first trigger instruction triggered by the memory controller 102-A of the source memory card, that a memory card in which the volume of erroneous data exceeds the threshold is the source memory card 101-A, and determines the backup memory card 101-C according to the pre-acquired identifier of the backup memory card.

(2) The first trigger instruction may be further generated by the OS according to a startup instruction of the memory data migration that is sent by the user, or may be generated by the OS according to a startup policy of the memory data migration that is preset by the user in the OS. For example, the user directly sends the startup instruction of the memory data migration to the OS, the OS generates the first trigger instruction according to the startup instruction of the user. For another example, the user pre-configures, in the OS, a startup policy that the memory data migration is started up according to time or a running status of the processor, and the OS generates the first trigger instruction when the startup policy is met. The OS suspends, according to the first trigger instruction, the task that is being executed, to start up the memory data migration.

About Migrating Memory Data in Fractionated Manner

In an exemplary embodiment of the embodiments of the present invention, the memory data migration is performed in multiple times. During a process of performing the memory data migration, the OS 103 suspends the task that is being executed, the OS 103 can continue to execute the suspended task or another task only after the memory data migration has been completed; and if there is too much to-be-migrated data, the OS 103 suspends a system service for a long time, which affects normal running of the computer. Therefore, the memory data of the source memory card may be migrated to the backup memory card in multiple times. After one time of the memory data migration has been completed, the OS 103 may suspend execution of the memory data migration, and continue to execute the suspended task or the another task until a next time of memory data migration when the OS 103 suspends again a task that is being executed, and continue to execute the memory data migration, thereby avoiding long-time interruption to a computer service and ensuring the normal running of the computer.

With respect to the foregoing fractionated manner of performing the memory data migration, in another embodiment of the present invention, the OS 103 may be further improved. The OS 103 may further acquire a multiple migration policy, and instruct, according to the multiple migration policy, the memory controller 102-A of the source memory card to perform the memory data migration in multiple times, where the multiple migration policy may be configured by the user. For example, the user may designate a data volume of each time of migration or duration of each time of migration as required, and the OS 103 is configured to execute, according to the data volume of each time of migration or the duration of each time of migration that are designated, the following operations a) to d) until all the memory data of the source memory card 101-A is migrated to the backup memory card 101-C, where the operations a) to d) include:

a) determining a volume of data for current migration according to the data volume designated for each time of migration, and instructing the memory controller 102-A of the source memory card to migrate data of the volume for the current migration to the backup memory card 101-C; or determining duration of current migration according to the duration of each time of migration, and instructing the memory controller 102-A of the source memory card to perform the memory data migration during the duration of the current migration; or instructing, according to a running status of the processor, the memory controller 102-A of the source memory card to perform the memory data migration in a time period in which the running status of the processor is idle, where that the running status of the processor is an idle state may be that usage of the processor is less than a set threshold;

b) after it is determined that the memory controller 102-A of the source memory card has completed the current migration, suspending, by the OS, execution of the memory data migration;

c) receiving a second trigger instruction, where the second trigger instruction is used to instruct the OS to continue to perform the memory data migration; and d) returning to execute step a).

Through the foregoing operations a) to d), the OS 103 migrates the data of the source memory card 101-A to the backup memory card 101-C in the fractionated manner.

The second trigger instruction in operation c) may not only be manually triggered by the user, but also be triggered according to a pre-configured trigger condition of the second trigger instruction. For example, the trigger condition of the second trigger instruction may be configured in the migration policy, and the trigger condition of the second trigger instruction may include an interval for migration or the running status of the processor. The OS 103 may set a memory data migration timer, where the memory data migration timer triggers the second trigger instruction according to the interval for migration; or monitor the running status of the processor in real time, and trigger the second trigger instruction when the running status of the central processing unit is idle.

In this embodiment of the present invention, the OS 103 may instruct, according to the multiple migration policy, the memory controller 102-A of the source memory card to migrate the memory data of the source memory card to the backup memory card in multiple times, so that the OS 103 can suspend and resume an executed task as required during a process of performing the memory data migration, and the OS can process a service that is in the computer in time, to avoid long-lime interruption to a system service due to migration of a large volume of memory data, thereby ensuring the normal running of the computer.

About Setting Mirror Mode Between Source Memory Card and Backup Memory Card

Before the memory data migration is performed, the OS 103 may further set a mirror mode between the source memory card and the backup memory card, so that the memory controller 102-A of the source memory card may write the memory data of the source memory card into the backup memory card according to an instruction of the OS 103 and the mirror module.

Specifically, after the source memory card 101-A and the backup memory card 101-C are determined, the OS 103 may configure an identifier of the backup memory card in the memory controller 102-A of the source memory card, and configure an identifier of the source memory card in the memory controller 102-C of the backup memory card, to set a mirror mode between the source memory card 101-A and the backup memory card 101-C.

The OS 103 may further send a data read instruction to the memory controller associated with the source memory card, where the data read instruction is used to instruct the memory controller 102-A of the source memory card to read data of the source memory card 101-A; receive a message that responds to the data read instruction and that is sent by the memory controller 102-A of the source memory card; and send a data write instruction to the memory controller 102-A of the source memory card, where the data write instruction is used to instruct the memory controller associated with the source memory card to write the read data back to the source memory card, so that the memory controller 102-A of the source memory card may read the data of the source memory card 101-A according to the data read instruction sent by the OS 103, write the read data back to the source memory card 101-A according to the data write instruction sent by the OS 103, and write the read data into the backup memory card 101-C according to the identifier of the backup memory card that is configured in the memory controller 102-A of the source memory card, to migrate the data of the source memory card 101-A to the backup memory card 101-C.

In the foregoing manner, the OS 103 may migrate all the data of the source memory card 101-A to the backup memory card 101-C instead of migrating only new data for a write operation that is performed on the source memory card 101-A after the memory data migration is started up. Therefore, complete memory data migration is ensured. In addition, the mirror mode is set between the source memory card and the backup memory card, so that when the OS continues to execute the suspended task or another task, any write operation performed on the source memory card by the OS is also performed on the backup memory card, thereby ensuring accuracy of the memory data that has been migrated to the backup memory card.

About Migrating Non-Erroneous Data

When there is too much erroneous data in a memory card, a memory card fault and even a computer restart may occur. Therefore, during a process of performing memory data migration, the migration may be performed only on non-erroneous data.

The OS 103 may further instruct the memory controller 102-A of the source memory card to determine non-erroneous data that is in the source memory card 101-A, and instruct, according to a mark of the non-erroneous data determined by the memory controller 102-A of the source memory card, the memory controller 102-A of the source memory card to migrate the non-erroneous data, to avoid a computer restart or a fault in the backup memory card 101-C that may be caused by migrating erroneous data of the source memory card 101-A to the backup memory card 101-C.

The memory controller 102-A of the source memory card may determine the non-erroneous data of the source memory card 101-A according to an instruction of the OS 103, and mark the non-erroneous data, for example, record a system address of the non-erroneous data or the erroneous data, so that the OS 103 may instruct, according to the system address of the non-erroneous data or the erroneous data, the memory controller associated with the source memory card to migrate the non-erroneous data, to avoid a computer restart that may be caused by migrating the erroneous data of the source memory card to the backup memory card.

About Migration Condition

To ensure that the memory data migration is performed successfully, before the memory data migration is performed, the OS 103 may check whether the backup memory card 101-C meets a migration condition, that is, whether backup memory card 101-C can be used as a target device of data of a data migration of the source memory card 101-A, to avoid a data migration failure caused by situations such as that the backup memory card 101-C has not been completely initialized or a memory capacity is insufficient.

Specifically, before the memory data migration is performed, the BIOS 104 may further determine whether the backup memory card 101-C has completed the special initialization, and if the backup memory card 101-C has completed the special initialization, it indicates that the backup memory card 101-C can be used normally, and therefore, the mirror mode is set between the source memory card 101-A and the backup memory card 101-C, to subsequently perform the memory data migration.

The OS 103 may further determine whether a memory capacity of the backup memory card is greater than a memory capacity of the source memory card 101-A, and if the memory capacity of the backup memory card is greater than the memory capacity of the source memory card 101-A, it is determined that the backup memory card meets the migration condition, and the memory data of the source memory card may be subsequently migrated to the backup memory card.

The OS 103 may further determine whether the source memory card 101-A and the backup memory card 101-C are controlled by a same processor, and if the source memory card 101-A and the backup memory card 101-C are not controlled by a same processor, it indicates that the data of the source memory card 101-A may be migrated to the backup memory card, and therefore, the mirror mode is set between the source memory card 101-A and the backup memory card 101-C, to subsequently perform the memory data migration.

The OS 103 may acquire, from the BIOS 104, information such as whether the backup memory card has been completely initialized, and the memory capacity of the backup memory card, to determine whether the backup memory card meets the migration condition.

About Replacement of Backup Memory Card and Source Memory Card after Memory Data Migration has been Completed After the memory controller 102-A of the source memory card migrates all the data of the source memory card 101-A to the backup memory card 101-C, the OS 103 may further establish a mapping relationship between a system address of the source memory card 101-A and the backup memory card 101-C, change a target memory card to which the system address of the source memory card points, to the backup memory card, so that the backup memory card 101-C may take over, in replacement of the source memory card 101-A, all read/write operations performed on the source memory card 101-A by the OS 103.

After the backup memory card has replaced the source memory card, the OS 103 may further execute a power-off operation on the source memory card 101-A. For example, a register of the memory controller 102-A of the source memory card is configured, to power off the source memory card 101-A, so that the source memory card 101-A can be removed or replaced without powering off of the computer, thereby resolving a problem in the prior art that a faulty memory card can be replaced or maintained only after an entire computer is powered off.

Memory Data Migration Method

Figure 2:
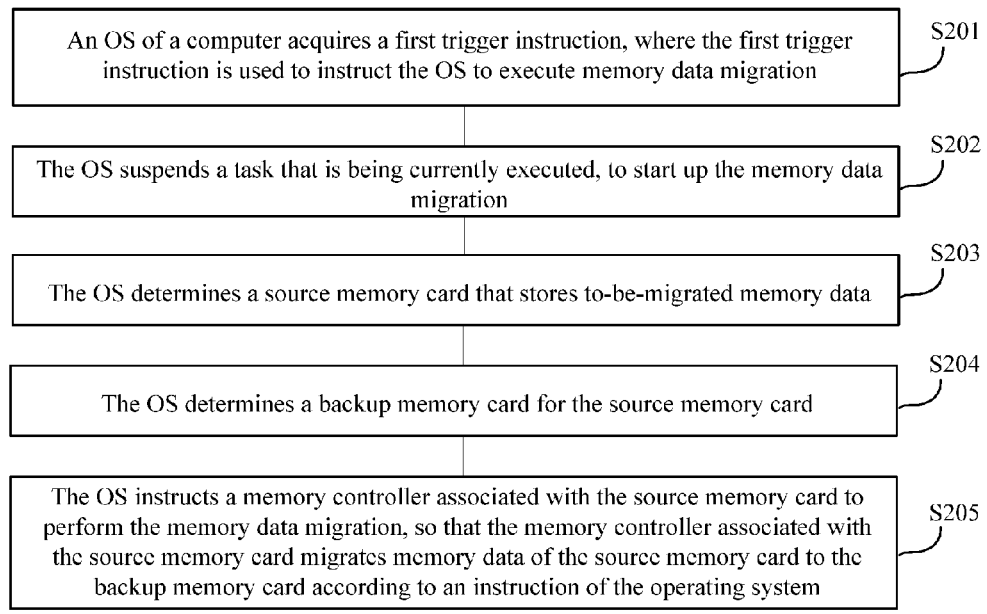
FIG. 2 is a flowchart of a memory data migration method according to an embodiment of the present invention.

With reference to the computer shown in FIG. 1, an embodiment of the present invention provides a memory data migration method. As shown in FIG. 2, the method is used to migrate memory data that is in the computer, where the method includes:

S201: An OS of the computer acquires a first trigger instruction, where the first trigger instruction is used to instruct the OS to execute memory data migration.

The first trigger instruction may be triggered by a memory controller associated with a source memory card. For example, when the memory controller associated with the source memory card determines, by monitoring, that a source memory card is faulty for multiple times, which reaches a preset threshold, the memory controller associated with the source memory card may instruct, by using the first trigger instruction, the OS to start up the memory data migration on the source memory card that is faulty for multiple times; or the first trigger instruction may be generated by the OS according to a user instruction. For example, when a user finds that performance of a memory card is unstable or in another situation in which replacement is required, the user may send a startup instruction of the memory data migration to the OS, so that the OS generates the first trigger instruction according to the startup instruction, to execute the memory data migration. For another example, the user may pre-configure a startup policy of the memory data migration in the operating system, and when the startup policy is met, the OS generates the first trigger instruction.

S202: The OS suspends a task that is being executed, to start up the memory data migration.

After receiving the first trigger instruction, the OS may suspend the task that is being executed, to perform the memory data migration.

S203: The OS determines a source memory card that stores to-be-migrated memory data.

After the memory data migration is started up, the OS needs to determine the source memory card that stores the to-be-migrated memory data, where the OS may determine, by searching a memory controller associated with the computer, that a memory card corresponding to a memory controller that triggers the first trigger instruction is the source memory card, or determine, according to the user instruction, that a memory card whose memory data needs to be migrated is the source memory card.

S204: The OS determines a backup memory card for the source memory card.

The OS further needs to determine the backup memory card for the source memory card, to migrate memory data of the source memory card to the backup memory card. The backup memory card may be a memory card to which no system address is allocated for the moment, and is invisible to the OS, and the OS does not perform any write operation on the backup memory card for the moment.

The backup memory card may be pre-configured, or may be inserted and assigned at the moment, and specific implementation is described in detail in a subsequent embodiment.

S205: The OS instructs a memory controller associated with the source memory card to perform the memory data migration, so that the memory controller associated with the source memory card migrates memory data of the source memory card to the backup memory card according to an instruction of the operating system.

After the source memory card and the backup memory card are determined, the OS may instruct the memory controller associated with the source memory card to start to perform the memory data migration. For example, the OS may instruct the memory controller associated with the source memory card to read the memory data of the source memory card, and then instruct the memory controller associated with the source memory card to write the read memory data of the source memory card into the backup memory card, to implement the memory data migration. The OS may migrate all the memory data of the source memory card to the backup memory card in the foregoing manner of reading and writing the memory data of the source memory card, instead of migrating, after the memory data migration is started up, only data that is newly written into the source memory card.

In this embodiment of the present invention, an OS may receive a first trigger instruction, determine a source memory card that stores to-be-migrated memory data, and determine a backup memory card for the source memory card, to instruct a memory controller associated with the source memory card to write memory data of the source memory card into the backup memory card. Therefore, the memory data of the source memory card can be migrated without powering off of a computer, thereby implementing online maintenance on a faulty memory card and resolving a problem in the prior art that a faulty memory card can be replaced or maintained only after an entire computer is powered off. In addition, in this embodiment of the present invention, the OS performs memory data migration only when there is a need for memory data migration, that is, when the first trigger instruction is received. Therefore, it is ensured that a memory card fault is rectified in time, and system resources are saved.

Specific Method Embodiment 1

Figure 3:
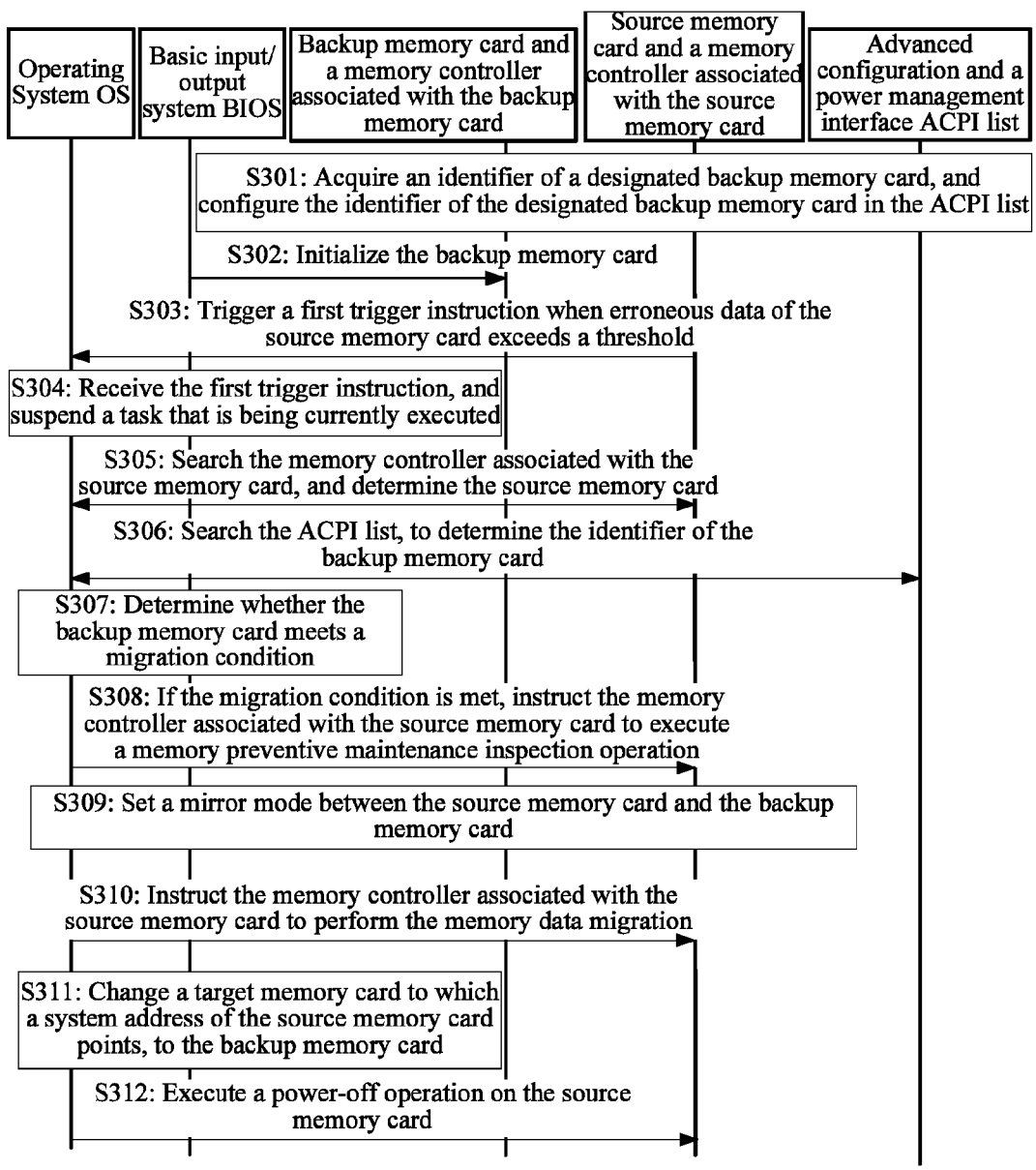
FIG. 3 is a flowchart of another memory data migration method according to an embodiment of the present invention.

With reference to the computer shown in FIG. 1, an embodiment of the present invention provides a memory data migration method. As shown in FIG. 3, the method is used to migrate memory data that is in the computer. For example, memory data of a source memory card may be migrated to a backup memory card, where the source memory card is a memory card visible to the OS 103, that is, a memory card on which the OS 103 can perform a read/write operation, that is, a memory card whose data needs to be migrated due to a fault, such as the memory cards 101-A and 101-B in this embodiment. The backup memory card is a memory card invisible to the OS 103, that is, a memory card on which the OS 103 cannot perform any read/write operation for the moment and that may be used as a target device of to-be-migrated data, such as the memory card 101-C in this embodiment. After memory data migration has been completed, configuration information of the backup memory card may be changed. For example, a system address may be allocated to the backup memory card, so that the OS 103 may perform a read/write operation on the backup memory card.

In this embodiment of the present invention, the backup memory card 101-C may be a memory card that has been inserted into a hardware slot before the computer is powered on, or may be a memory card that is added at the moment after the computer is powered on and started up, provided that special initialization is performed on the backup memory card before the memory data migration is performed (no system address is allocated, which is described in detail in a subsequent embodiment).

The memory data migration method in this embodiment of the present invention may include:

S301: A BIOS acquires an identifier of a designated backup memory card, and configures the identifier of the designated backup memory card in an ACPI list.

A user may configure the identifier of the designated backup memory card by using a start menu of the BIOS when the computer is powered on and started up, and the BIOS may acquire the identifier of the backup memory card that is configured by the user, and writes the identifier of the backup memory card into the advanced configuration and power management interface (Advanced Configuration and Power Management Interface, ACPI) list, so that the OS may subsequently acquire information about the backup memory card by searching the ACPI list.

The ACPI list is a set of information tables exchanged between the OS and the BIOS, and can be accessed by both the OS and the BIOS. Certainly, in this embodiment of the present invention, the identifier of the backup memory card may not be necessarily configured in the ACPI list, provided that the identifier of the backup memory card is configured in storage space or a list that can be accessed by both the BIOS and the OS, so that the OS can acquire the identifier of the backup memory card after the BIOS configures the identifier of the backup memory card, and this embodiment of the present invention imposes no limitation herein.

The identifier of the backup memory card may be a slot number of a slot into which the backup memory card is inserted or a related number of the slot. In this embodiment of the present invention, when the identifier of the backup memory card is designated, if the backup memory card has been inserted into a slot, the identifier of the backup memory card may be a slot number of the slot into which the backup memory card is currently inserted; or if the backup memory card has not been inserted into a slot, the identifier of the backup memory card may be a slot number of a slot designated by the user, and the backup memory card may be directly inserted into the slot designated by the user when the backup memory card needs to be used subsequently.

Step 301 is an optional step. The user may not necessarily provide the identifier of the backup memory card for the BIOS when the computer is powered on and started up. The user may directly provide the identifier of the backup memory card for the OS after the computer is powered on and started up, the OS records the identifier of the backup memory card, and acquires, in subsequent use, the identifier of the backup memory card that is recorded by the OS, and this embodiment imposes no limitation herein.

S302: The BIOS initializes the backup memory card, where a process of the initialization avoids allocating a system address to the backup memory card.

After acquiring the identifier of the backup memory card that is designated by the user, the BIOS may restart the computer, to perform the special initialization on the backup memory card, that is, the process of the initialization avoids allocating a system address to the backup memory card.

Specifically, the BIOS may determine, according to the identifier of the backup memory card, whether the backup memory card has been inserted into the slot, and if the backup memory card has been inserted into the slot, that is, it is determined that the backup memory card already exists as hardware, the backup memory card may be initialized, so that the backup memory card is ready, but the OS cannot perform any read/write operation on the backup memory card for the moment.

The initializing the backup memory card refers to configuring the backup memory card, so that the backup memory card is ready and can be used normally. For example, the initializing the backup memory card may include supplying power to the backup memory card, configuring parameters such as related performance, configuring a communication connection between the backup memory card and a processor of the computer, detecting whether the backup memory card can perform a normal read/write operation, and the like. It should be noted that, when the backup memory card is being initialized, allocating a system address to the backup memory card is avoided, so that the OS cannot acquire a system address of the backup memory card and cannot perform any read/write operation on the backup memory card, that is, although the backup memory card is ready, the backup memory card is invisible to the OS. In this case, the OS cannot use the backup memory card.

In this embodiment of the present invention, the special initialization performed on the backup memory card refers to the foregoing initialization process.

Certainly, this step is an optional step. In practice, the BIOS may not perform the special initialization on the backup memory card after acquiring the identifier of the backup memory card, but perform the special initialization on the backup memory card when the backup memory card needs to be used subsequently.

S303: A memory controller associated with a source memory card monitors erroneous data of the source memory card, and determines whether a volume of the erroneous data exceeds a threshold, and the memory controller associated with the source memory card triggers a first trigger instruction if the volume of erroneous data exceeds the threshold.

When a volume of erroneous data in a memory card exceeds a value, a fault may occur on the memory card, and even a computer restart is caused. Therefore, the source memory card may be monitored, and when there is too much erroneous data in the source memory card, the OS executes memory data migration, to ensure that a problem is resolved.

Specifically, when the computer is powered on and started up, the user may configure the memory controller associated with the source memory card by using the start menu of the BIOS, so that the memory controller associated with the source memory card can monitor the erroneous data of the source memory card, and trigger the first trigger instruction when the volume of the erroneous data of the source memory card exceeds the threshold, where the first trigger instruction is used to instruct the OS to start up the memory data migration, and the threshold may be designated by the user, or may be a default value of a system.

If there are multiple source memory cards in the computer, erroneous data of each source memory card may be monitored, the first trigger instruction is triggered when it is determined, by monitoring, that a volume of erroneous data of any of the multiple source memory cards exceeds the threshold, and the first trigger instruction instructs the OS to start up memory data migration on the memory card.

Further, the memory controller associated with the source memory card may record, in a register of the memory controller associated with the source memory card, that the volume of the erroneous data of the source memory card exceeds the threshold, to subsequently instruct the OS to determine a memory card with a problem, that is, the source memory card.

In this embodiment of the present invention, a source memory card in the computer can be monitored, the first trigger instruction is triggered for a source memory card with a problem, to perform the memory data migration, to ensure that a fault is rectified in time and that memory data migration is performed only when a source memory card is faulty, thereby saving system resources.

S304: The OS receives the first trigger instruction, and suspends a task that is being executed, to start up memory data migration.

After receiving the first trigger instruction, the OS may immediately suspend the task that is being executed, to execute the memory data migration, or may suspend, when the computer is idle, the task that is being executed, to execute the memory data migration.

Further, the OS may be pre-configured, and the first trigger instruction may be configured to be a processing instruction with a highest priority, so that after acquiring the first trigger instruction, the OS immediately suspends the task that is being executed, to execute the memory data migration. Therefore, it is ensured that memory data of a faulty memory card is migrated in time and a problem of a memory card fault in the computer is rectified and resolved in time.

S305: The OS searches the memory controller associated with the source memory card, and determines the source memory card.

After the OS suspends the task that is being executed, to start up the memory data migration, it is required to determine a memory card that stores to-be-migrated data, that is, the source memory card, and the OS may determine that a memory card corresponding to the memory controller that triggers the first trigger instruction is the source memory card. For example, a register of a memory controller in the computer is searched, and the source memory card is determined by using information recorded in the register of the memory controller associated with the source memory card.

S306: The OS searches the ACPI list, to determine the identifier of the backup memory card.

An identifier of a backup memory card is recorded in the ACPI list in advance. After determining execution of the memory data migration, the OS may acquire the identifier of the backup memory card from the ACPI list, where there may be one or more identifiers of the backup memory card. If there are multiple identifiers of the backup memory card, the OS may acquire multiple identifiers of the backup memory card from the ACPI list, and select, according to information about the source memory card, one identifier from the multiple identifiers of the backup memory card as the identifier of the backup memory card. For example, a memory card with a memory capacity greater than a memory capacity of the source memory card is selected from the multiple backup memory cards according to the memory capacity of the source memory card, and an identifier of the memory card is determined as the identifier of the backup memory card. For another example, a memory card not controlled by a same processor as the source memory card may be selected from the multiple backup memory cards according to information about a processor to which the source memory card belongs, and an identifier of the memory card is determined as the identifier of the backup memory card.

S307: The OS determines whether the backup memory card meets a migration condition.

Before the memory data migration of the source memory card is performed, the BIOS needs to determine whether the backup memory card meets the migration condition, and performs the memory data migration on the source memory card only if the backup memory card meets the migration condition, thereby ensuring that the memory data migration is performed successfully, and avoiding a data migration failure due to problems such as an insufficient memory capacity of the backup memory card.

The determining whether the backup memory card meets the migration condition may specifically be as follows: determining whether the backup memory card has been completely initialized, where if the backup memory card has been completely initialized, it indicates that the backup memory card is ready and meets the migration condition; or if step S302 is not executed before this step, that is, if special initialization on the backup memory card has not been completed, the OS may instruct, by triggering system management interrupt, the BIOS to perform the special initialization on the backup memory card, so that the backup memory card is ready and meets the migration condition.

Further, the determining whether the backup memory card meets the migration condition may further be as follows: determining whether the memory capacity of the backup memory card is greater than the memory capacity of the source memory card, where if the memory capacity of the backup memory card is greater than the memory capacity of the source memory card, it indicates that the memory data of the source memory card may be migrated to the backup memory card, and the backup memory card meets the migration condition; or determining whether the source memory card and the backup memory card are controlled by a same processor, where if it is determined that the source memory card and the backup memory card are not controlled by a same processor, it indicates that the memory data of the source memory card may be migrated to the backup memory card, and the backup memory riser meets the migration condition.

The OS may acquire, from the BIOS, information about the backup memory card such as whether the backup memory card has been completely initialized, and the memory capacity of the backup memory card; and determine whether the backup memory card meets the migration condition.

S308: If the backup memory card meets the migration condition, the OS instructs the memory controller associated with the source memory card to execute a memory preventive maintenance inspection operation, to determine non-erroneous data that is in the source memory card.

Before the memory data migration is performed, the OS may instruct the memory controller associated with the source memory card to execute the memory preventive maintenance inspection operation, to determine the non-erroneous data that is in the source memory card, and make a detection mark according to a detection result, so that when the memory data of the source memory card is subsequently migrated to the backup memory card, only the non-erroneous data in the source memory card may be migrated according to the detection mark, thereby avoiding a problem caused by migrating erroneous data to the backup memory card, such as a computer restart.

The memory controller associated with the source memory card can start up the memory preventive maintenance inspection operation according to an instruction of the OS, where the memory preventive maintenance inspection operation may be specifically as follows: detecting the memory data of the source memory card according to a set error detection mechanism, to determine which data in the source memory card is erroneous data, and recording a system address of the erroneous data, that is, making a detection mark according to a detection result, so that when the memory data migration is subsequently performed, the OS can migrate, according to the recorded system address of the erroneous data, the non-erroneous data that is in the source memory card.

After executing the preventive maintenance inspection operation, the memory controller associated with the source memory card may configure the register of the memory controller associated with the source memory card, the OS may determine, by searching the register, whether the preventive maintenance inspection operation has been completed, and when the preventive maintenance inspection operation has been completed, the OS may set a mirror mode between the source memory card and the backup memory card, to perform the memory data migration.

This step is an optional step, and the OS may not necessarily instruct the source memory controller to perform the memory preventive maintenance inspection operation.

S309: If the backup memory card meets the migration condition, the OS sets a mirror mode between the source memory card and the backup memory card.

To implement the memory data migration, the OS may set the mirror mode between the source memory card and the backup memory card, and after the mirror mode is set, the memory controller associated with the source memory card can write the memory data of the source memory card into the backup memory card according to an instruction of the OS.

Specifically, the OS may configure the identifier of the backup memory card in the memory controller associated with the source memory card, and configure an identifier of the source memory card in a memory controller associated with the backup memory card, to set the mirror mode between the source memory card and the backup memory card, so that the source memory card can send the memory data of the source memory card to the memory controller associated with the backup memory card according to the instruction of the OS, and the memory controller associated with the backup memory card writes the memory data of the source memory card into the backup memory card.

In addition, the setting the mirror mode between the source memory card and the backup memory card may further include that: the OS copies address configuration information of the memory controller associated with the source memory card to the memory controller associated with the backup memory card, so that the memory controller associated with the backup memory card allocates a system address to the backup memory card in an address allocation manner of the source memory card.

S310: The OS instructs the memory controller associated with the source memory card to perform the memory data migration.

After setting the mirror mode between the source memory card and the backup memory card, the OS may instruct the memory controller associated with the source memory card to perform the memory data migration on the source memory card.

Specifically, the OS may send a data read instruction to the memory controller associated with the source memory card, where the data read instruction is used to instruct the memory controller associated with the source memory card to read the memory data of the source memory card; and after it is determined that the memory controller associated with the source memory card has completed the data read instruction, the OS may send a data write instruction to the memory controller associated with the source memory card, where the data write instruction is used to instruct the memory controller associated with the source memory card to write the read data back to the source memory card, so that the memory controller associated with the source memory card can read the memory data of the source memory card according to the data read instruction, write the read data into the source memory card according to the data write instruction, and send the read data to the memory controller associated with the backup memory card according to the mirror mode, so that the memory controller associated with the backup memory card can write the read data into the backup memory card, to implement the memory data migration, and can migrate all the memory data of the source memory card to the backup memory card, instead of migrating, after the memory data migration is started up, only data that is newly written into the source memory card.

Before the memory controller associated with the source memory card performs the memory data migration, the operating system suspends the task that is being executed, the OS can continue to execute the suspended task or another task only after the memory data migration has been completed; and if there is too much to-be-migrated data, the OS suspends a system service for a long time, which affects normal running of the computer. Therefore, the memory data of the source memory card may be migrated to the backup memory card in multiple times. After one time of the memory data migration has been completed, the OS may suspend execution of the memory data migration, and continue to execute the suspended task or the another task until a next time of memory data migration when the OS suspends again a task that is being executed, and continue to execute the memory data migration, thereby avoiding long-time interruption to a computer service and ensuring the normal running of the computer.

In this embodiment of the present invention, to implement the foregoing method for performing the memory data migration in the fractionated manner, the user may pre-configure, in the OS, a data volume of each time of migration or duration of each time of migration, that is a multiple migration policy, so that the OS may instruct, according to the multiple migration policy, the memory controller associated with the source memory card to perform the memory data migration in the fractionated manner. Specifically, the OS may instruct, by using the following steps, the memory controller associated with the source memory card to perform the memory data migration in the fractionated manner:

a) the OS determines a volume of data for current migration according to the data volume designated for each time of migration, and instructs the memory controller associated with the source memory card to migrate data of the volume for the current migration to the backup memory card; or the OS determines duration of current migration according to the duration of each time of migration, and instructs the memory controller associated with the source memory card to perform the memory data migration during the duration of the current migration;

b) after it is determined that the memory controller associated with the source memory card has completed the current migration, the OS suspends execution of the memory data migration;

c) receive a second trigger instruction, where the second trigger instruction is used to instruct the OS to continue to perform the memory data migration; and d) return to execute step a), until all the memory data of the source memory card is migrated to the backup memory card.

In step b), when the computer suspends the execution of the memory data migration, the OS may perform a read/write operation on the source memory card; even if the OS performs a data-write operation on a data block A that has been migrated and that is in the source memory card, because the mirror mode is set, the memory controller associated with the source memory card can also write data of the write operation into a data block A of the backup memory card, thereby avoiding data loss and ensuring data consistency between the backup memory card and the source memory card.

In addition, the user may further configure a trigger condition of the second trigger instruction in the multiple migration policy, where the trigger condition of the second trigger instruction may be an interval for migration. Then, the OS may acquire the interval for migration from the migration policy, and configure a memory data migration timer according to the interval for migration, so that the memory data migration timer triggers the second trigger instruction according to the interval for migration, to instruct the OS to continue to perform the memory data migration. The memory data migration timer may be provided in the OS, and when the memory data migration timer times out, the OS enters an interruption processing function, suspends the task that is being executed, and continues to perform the memory data migration.

The second trigger instruction may further be triggered according to a running status of the processor. The OS may monitor the running status of the processor, and determine, according to the running status of the processor, whether to trigger the second trigger instruction, to execute the memory data migration. For example, the OS may trigger interruption to the OS when a CPU is in an idle state, or usage of the CPU is less than a specific threshold, so that the OS suspends the task that is being executed, and continues to perform the memory data migration.

Further, when instructing the memory controller associated with the source memory card to perform the memory data migration, the OS may instruct, according to the address of the erroneous data that is recorded by the memory controller associated with the source memory card, the memory controller associated with the source memory card to migrate the non-erroneous data that is in the source memory card to the backup memory card, thereby avoiding a computer restart that may be caused by migrating the erroneous data that is in the source memory card to the backup memory card.

S311: The OS changes a target memory card to which a system address of the source memory card points, to the backup memory card.

After the memory data migration has been completed, the OS may map the system address of the source memory card to the backup memory card, to change the target memory card to which the system address of the source memory card points, to the backup memory card, so that the backup memory card may take over, in replacement of the source memory card, all read/write operations performed on the source memory card by the OS.

In this embodiment of the present invention, the OS may map the system address of the source memory card to the backup memory card by configuring the CPU of the computer.

S312: The OS executes a power-off operation on the source memory card.

After the memory data migration of the source memory card has been completed, the OS may execute the power-off operation on the source memory card. For example, the memory controller associated with the source memory card is configured, to power off the source memory card, and therefore, the source memory card may be removed or replaced without powering off of the computer, thereby resolving a problem in the prior art that a faulty memory card can be replaced or maintained only after an entire computer is powered off.

In this embodiment of the present invention, an OS may receive a first trigger instruction, to determine a source memory card and a backup memory card, and set a mirror mode between the source memory card and the backup memory card after it is determined that the backup memory card meets a migration condition, to instruct a memory controller associated with the source memory card to write memory data of the source memory card into the backup memory card according to the mirror mode. Therefore, the memory data of the source memory card can be migrated without powering off of a computer, thereby implementing online maintenance on a faulty memory card and resolving a problem in the prior art that a faulty memory card can be replaced or maintained only after an entire computer is powered off. In addition, in this embodiment of the present invention, the OS triggers the first trigger instruction for a memory controller associated with a source memory card with a problem, to perform memory data migration, which can ensure that a fault is rectified in time and that the memory data migration is performed only when a source memory card is faulty, thereby saving system resources.

Further, the OS may acquire a multiple migration policy, and instruct, according to the multiple migration policy, the memory controller associated with the source memory card to migrate the memory data of the source memory card to the backup memory card in multiple times, so that the OS is enabled to suspend or resume an executed task as required during a process of performing the memory data migration, and the OS can process a service that is in the computer in time, to avoid long-lime interruption to a system service due to migration of a large volume of memory data, thereby ensuring normal running of the computer.

In addition, the OS can instruct the memory controller associated with the source memory card to determine non-erroneous data that is in the source memory card, and instruct the memory controller associated with the source memory card to migrate the non-erroneous data to the backup memory card, thereby avoiding a computer restart that may be caused by migrating erroneous data that is in the source memory card to the backup memory card.

In this embodiment of the present invention, before performing the memory data migration, the OS may determine whether the backup memory card meets a migration condition, and perform the memory data migration on the source memory card only if the backup memory card meets the migration condition, thereby ensuring that the memory data migration is performed successfully, and avoiding a data migration failure due to problems such as an insufficient memory capacity of the backup memory card.

Specific Embodiment 2

Figure 4:
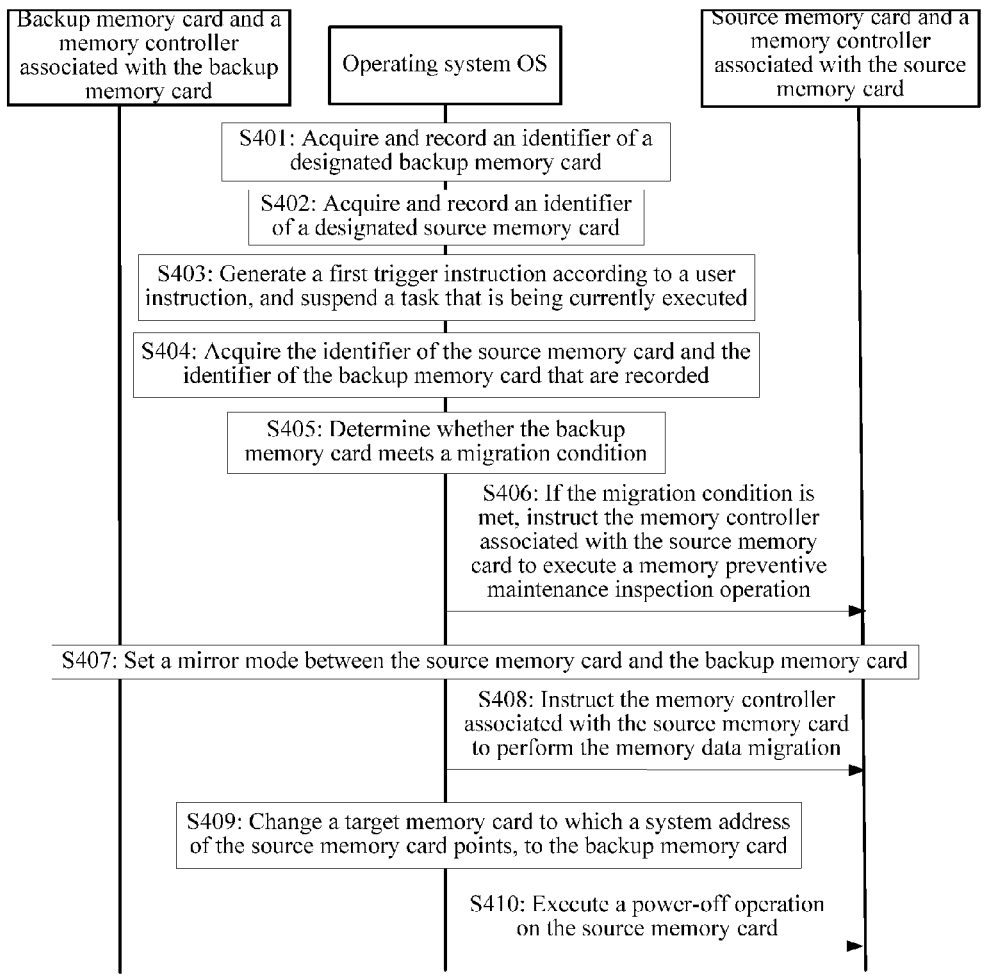
FIG. 4 is a flowchart of still another memory data migration method according to an embodiment of the present invention.

With reference to the computer shown in FIG. 1, an embodiment of the present invention provides a memory data migration method. As shown in FIG. 4, the method is used to migrate memory data that is in the computer. For example, memory data of a source memory card of the computer can be migrated to a backup memory card, where the source memory card may be the memory card 101-A, the backup memory card may be the memory card 101-C, and the memory card 101-C may be a memory card that has been inserted into a hardware slot before the computer is powered on, or may be a memory card added at the moment, provided that an identifier of the memory card 101-C is configured in an ACPI list before memory data migration is performed and initialization has been executed before the migration. The memory data migration method in this embodiment of the present invention may include:

S401: An OS acquires and records an identifier of a designated backup memory card.

A slot number of a slot into which each memory card is inserted or a number related to the slot may be configured in the OS, the identifier of the backup memory card may be a slot number of a slot into which the backup memory card is inserted or a number related to the slot, and the backup memory card may have been inserted into the slot before the computer is powered on and started up, or may be inserted into the slot after the computer is powered on and started up.

After the computer is powered on and started up, a user may provide the identifier of the designated backup memory card to the OS, the OS may acquire and record the identifier of the designated backup memory card, so that the OS may acquire information about the backup memory card when it is subsequently determined to execute the memory data migration. The identifier of the backup memory card may be recorded in the OS, or may be recorded in the ACPI list or another storage unit, and this embodiment of the present invention imposes no limitation herein.

This step is an optional step. The user may further provide the identifier of the backup memory card to the BIOS, and the OS acquires, before performing the memory data migration, the identifier of the backup memory card that is recorded by the BIOS, to determine the backup memory card, and this embodiment of the present invention imposes on limitation herein.

Further, in this embodiment of the present invention, as a target device of to-be-migrated data, the backup memory card is a memory card invisible to the OS, and special initialization needs to be performed on the backup memory card, to ensure that the backup memory card is ready and avoid allocating a system address, so that the backup memory card is invisible to the OS. When the designated backup memory card is inserted into the slot after the computer is powered on and started up, and when the backup memory card is being inserted into the slot, the BIOS may be triggered, by using a trigger button on the backup memory card, to perform the special initialization on the backup memory card. Certainly, the backup memory card may also be initialized when the backup memory card needs to be used subsequently. When the designated backup memory card has been inserted into the slot before the computer is powered on and started up, and when the computer is being powered on and started up, the computer runs the BIOS, and the user further needs to configure the identifier of the backup memory card by using a start menu of the BIOS, so that the BIOS performs the special initialization on the backup memory card when it is determined that the backup memory card already exists as hardware.

The performing the special initialization on the backup memory card refers to configuring the backup memory card, so that the backup memory card is ready and can be used normally. For example, the initializing the backup memory card may include supplying power to the backup memory card, configuring parameters such as related performance, configuring a communication connection between the backup memory card and a processor of the computer, detecting whether the backup memory card can perform a normal read/write operation, and the like. It should be noted that, when the backup memory card is being initialized, allocating a system address to the backup memory card is avoided, so that the OS cannot acquire a system address of the backup memory card and cannot perform any read/write operation on the backup memory card, that is, although the backup memory card is ready, the backup memory card is invisible to the OS. In this case, the OS cannot use the backup memory card.

In this embodiment of the present invention, the special initialization performed on the backup memory card refers to the foregoing initialization process.

S402: The OS acquires and records an identifier of a designated source memory card.

After the computer is powered on and started up, when the user finds that performance of a memory card is unstable, an operation time is too long, or in another situation in which replacement is required, the user may designate the memory card as a memory card that stores to-be-migrated data, that is, the source memory card, and provide an identifier of the source memory card to the OS. The OS may record the identifier of the source memory card, so that the OS may subsequently acquire information about the source memory card. The identifier of the backup memory card may be recorded in the OS, or may be recorded in the ACPI list or another storage unit, and this embodiment of the present invention imposes no limitation herein.

S403: The OS receives a user instruction, generates a first trigger instruction according to the user instruction, and suspends, according to the first trigger instruction, a task that is being executed, to start up memory data migration.

When needing to perform the memory data migration, the user may send a startup instruction of the memory data migration to the OS, and the OS generates the first trigger instruction according to the startup instruction, suspends, according to the first trigger instruction, the task that is being executed, and enters an interruption processing function, to execute the memory data migration.

In this embodiment of the present invention, when the user needs to perform the memory data migration on the source memory card, the user may separately designate the identifier of the source memory card and the identifier of the backup memory card by using multiple instructions, and instruct the OS to execute the memory data migration; or the user may instruct, by using one instruction, the OS to execute the memory data migration, where the instruction carries the identifier of the source memory card and the identifier of the backup memory card, and this embodiment of the present invention imposes no limitation herein.

S404: The OS acquires the identifier of the source memory card and the identifier of the backup memory card that are recorded.

After the OS acquires the first trigger instruction triggered by the user, the OS enters the interruption processing function, to start up the memory data migration, and the OS may acquire the identifier of the source memory card and the identifier of the backup memory card that are recorded by the OS, that is, determine the source memory card and the backup memory card.

When there are multiple backup memory cards, the OS may select, according to the information about the source memory card, one identifier from identifiers of the multiple backup memory cards as the identifier of the backup memory card. For example, a memory card with a memory capacity greater than a memory capacity of the source memory card is selected from the multiple backup memory cards according to the memory capacity of the source memory card, and an identifier of the memory card is determined as the identifier of the backup memory card. For another example, a memory card not controlled by a same processor as the source memory card may be selected from the multiple backup memory cards according to information about a processor to which the source memory card belongs, and an identifier of the memory card is determined as the identifier of the backup memory card.

S405: The OS determines whether the backup memory card meets a migration condition.

S406: If the backup memory card meets the migration condition, the OS instructs a memory controller associated with the source memory card to execute a memory preventive maintenance inspection operation, to determine non-erroneous data that is in the source memory card.

S407: If the backup memory card meets the migration condition, the OS sets a mirror mode between the source memory card and the backup memory card.

S408: The OS instructs the memory controller associated with the source memory card to perform the memory data migration.

S409: The OS changes a target memory card to which a system address of the source memory card points, to the backup memory card.

S410: The OS executes a power-off operation on the source memory card.

In this embodiment of the present invention, specific implementation manners of steps S405-S410 are similar to those of steps S307-S312, and details are not described herein again.

In this embodiment of the present invention, an OS may receive a first trigger instruction of a user, to determine a source memory card and a backup memory card, and set a mirror mode between the source memory card and the backup memory card after it is determined that the backup memory card meets a migration condition, to instruct a memory controller associated with the source memory card to write memory data of the source memory card into the backup memory card according to the mirror mode. Therefore, the memory data of the source memory card can be migrated without powering off of a computer, thereby implementing online maintenance on a faulty memory card and resolving a problem in the prior art that a faulty memory card can be replaced or maintained only after an entire computer is powered off. In addition, in this embodiment of the present invention, during a running process of the computer, the OS may perform memory data migration according to the first trigger instruction triggered by the user, which can ensure that a fault is rectified in time and that the memory data migration is performed only when a source memory card is faulty, thereby saving system resources.

Further, the OS may acquire a multiple migration policy, and instruct, according to the multiple migration policy, the memory controller associated with the source memory card to migrate the memory data of the source memory card to the backup memory card in multiple times, so that the OS is enabled to suspend or resume an executed task as required during a process of performing the memory data migration, and the OS can process a service that is in the computer in time, to avoid long-lime interruption to a system service due to migration of a large volume of memory data, thereby ensuring normal running of the computer.

In addition, the OS can instruct the memory controller associated with the source memory card to determine non-erroneous data that is in the source memory card, and instruct the memory controller associated with the source memory card to migrate the non-erroneous data to the backup memory card, thereby avoiding a computer restart that may be caused by migrating erroneous data that is in the source memory card to the backup memory card.

In this embodiment of the present invention, before performing the memory data migration, the OS may determine whether the backup memory card meets a migration condition, and perform the memory data migration on the source memory card only if the backup memory card meets the migration condition, thereby ensuring that the memory data migration is performed successfully, and avoiding a data migration failure due to problems such as an insufficient memory capacity of the backup memory card.

Memory Data Migration Apparatus

Figure 5:
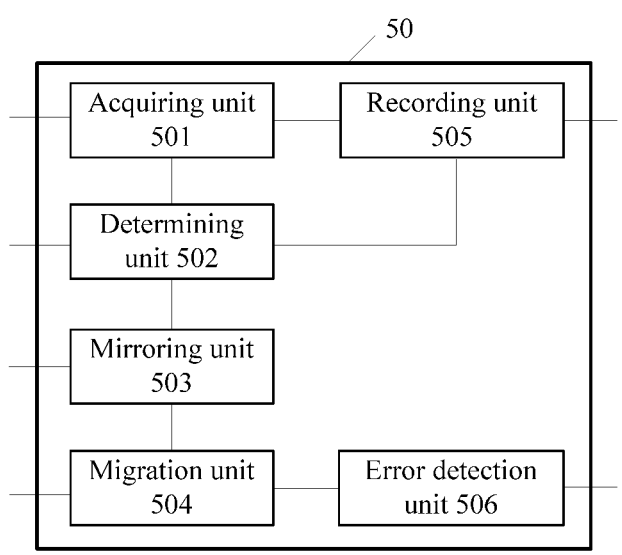
FIG. 5 is a schematic structural diagram of a memory data migration apparatus according to an embodiment of the present invention.

With reference to the computer shown in FIG. 1, an embodiment of the present invention provides a memory data migration apparatus. As shown in FIG. 5, the apparatus is configured to migrate memory data that is in the computer. For example, memory data of a source memory card of the computer can be migrated to a backup memory card, where the source memory card may be the memory card 101-A, the backup memory card may be the memory card 101-C, and the memory card 101-C may be a memory card that has been provided in the computer before the computer is powered on, or may be a memory card added at the moment, provided that the backup memory card has executed an initialization process before memory data migration. The memory data migration apparatus in this embodiment of the present invention may be an OS, where the apparatus may include an acquiring unit 501, a determining unit 502, a mirroring unit 503, and a migration unit 504.

The acquiring unit 501 is configured to acquire a first trigger instruction, where the first trigger instruction is used to instruct an operating system to execute memory data migration. In this embodiment of the present invention, the first trigger instruction is triggered in a relatively flexible manner, which may include the following two manners: manner 1 is that a memory controller associated with the source memory card may monitor erroneous data of the source memory card, and trigger the first trigger instruction if the volume of erroneous data exceeds a threshold, and the acquiring unit 501 is specifically configured to receive the first trigger instruction triggered by the memory controller associated with the source memory card; and manner 2 is that the acquiring unit 501 generates the first trigger instruction according to a startup instruction of the memory data migration sent by a user, or a startup policy of the memory data migration that is pre-configured by a user.

The determining unit 502 is configured to suspend, after the acquiring unit 501 acquires the first trigger instruction, a task that is being executed, to start up the memory data migration; determine a source memory card that stores to-be-migrated memory data; and determine a backup memory card for the source memory card. A manner for determining the source memory card by the determining unit 502 is also flexible. For example, when the first trigger instruction is triggered by the memory controller associated with the source memory card, the determining unit 502 may determine, by searching a register in the memory controller associated with the source memory card, that a memory card corresponding to the memory controller that triggers the first trigger instruction is the source memory card, and when the memory controller associated with the source memory card determines, by monitoring, that a volume of erroneous data of the source memory card exceeds the threshold, the memory controller associated with the source memory card may record, in the register of the memory controller associated with the source memory card, that the volume of the erroneous data of the source memory card exceeds the threshold. For another example, if the first trigger instruction is generated according to a user instruction, the acquiring unit 501 may further receive an identifier of the source memory card that is sent by the user, and the apparatus may further include a recording unit 505, configured to record the identifier of the source memory card, so that the identifier of the source memory card may be subsequently acquired at any time, and the determining unit 502 may determine the source memory card according to the identifier of the source memory card that is recorded by the recording unit 505.

In addition, there may also be two manners for determining the backup memory card. The user may provide an identifier of the backup memory card to the OS, and then the acquiring unit 501 may further acquire the identifier of the backup memory card designated by the user, the recording unit 505 is further configured to record the identifier of the backup memory card, and the determining unit 502 may determine the backup memory card according to the identifier of the backup memory card that is recorded by the recording unit 505; or the user may provide an identifier of the backup memory card to the BIOS, and the recording unit 505 may further acquire the identifier of the backup memory card that is recorded by the BIOS, and determine the backup memory card.

The mirroring unit 503 is configured to set a mirror mode between the source memory card and the backup memory card. For example, the mirroring unit 503 may configure the identifier of the backup memory card in the memory controller associated with the source memory card, and configure the identifier of the source memory card in a memory controller associated with the backup memory card, to set the mirror mode between the source memory card and the backup memory card, and after the mirror mode is set, the memory controller associated with the source memory card can write the memory data of the source memory card into the backup memory card according to the identifier of the backup memory card.

The migration unit 504 is configured to instruct the memory controller associated with the source memory card to perform the memory data migration, so that the memory controller associated with the source memory card writes the memory data of the source memory card into the backup memory card by using the mirror mode set by the mirroring unit 503. Specifically, the migration unit 504 may send a data read instruction to the memory controller associated with the source memory card, where the data read instruction is used to instruct the memory controller associated with the source memory card to read the memory data of the source memory card; and send a data write instruction to the memory controller associated with the source memory card, where the data write instruction is used to instruct the memory controller associated with the source memory card to write the read data back to the source memory card, so that the memory controller associated with the source memory card writes the read data into the backup memory card according to the mirror mode, to migrate the memory data of the source memory card to the backup memory card.

Further, the migration unit 504 is further configured to acquire a multiple migration policy, and instruct, according to the multiple migration policy, the memory controller associated with the source memory card to perform the memory data migration in multiple times, so that the computer can suspend and resume an executed task as required during a process of performing the memory data migration, and process a system service in time, to avoid long-lime interruption to the system service due to migration of a large volume of memory data, thereby ensuring normal running of a system.

Specifically, the multiple migration policy may include a data volume of each time of migration or duration of each time of migration, and the migration unit 504 is specifically configured to cyclically execute the following operations a) to d), until all the memory data of the source memory card is migrated to the backup memory card, where the operations a) to d) include:

a) determining a volume of data for current migration according to the data volume designated for each time of migration, and instructing the memory controller 102-A of the source memory card to migrate data of the volume for the current migration to the backup memory card 101-C; or determining duration of current migration according to the duration of each time of migration, and instructing the memory controller 102-A of the source memory card to perform the memory data migration during the duration of the current migration; or instructing, according to a running status of a processor, the memory controller 102-A of the source memory card to perform the memory data migration in a time period in which the running status of the processor is idle, where that the running status of the processor is an idle state may be that usage of the processor is less than a set threshold;

b) after it is determined that the memory controller 102-A of the source memory card has completed the current migration, suspending execution of the memory data migration;

c) receiving a second trigger instruction, where the second trigger instruction is used to instruct the OS to continue to perform the memory data migration; and d) returning to execute step a).

The second trigger instruction may be triggered by using a preset trigger condition of the second trigger instruction, and then the multiple migration policy may further include the trigger condition of the second trigger instruction, where the trigger condition of the second trigger instruction may include an interval for migration or the running status of the processor. The migration unit 504 is further configured to configure a memory data migration timer according to the interval for migration, so that the memory data migration timer triggers the second trigger instruction according to the interval for migration; or configure a memory data migration triggering module according to the running status of the processor, so that the memory data migration triggering module triggers the second trigger instruction according to the running status of the processor.

Further, the apparatus may further include:

an error detection unit 506, configured to instruct the memory controller associated with the source memory card to determine non-erroneous data that is in the source memory card; and the migration unit 504 is specifically configured to instruct, according to information about the non-erroneous data determined by the memory controller associated with the source memory card, the memory controller associated with the source memory card to migrate the non-erroneous data.

Further, the migration unit 504 is further configured to establish, after it is determined that the memory controller associated with the source memory card has completed the memory data migration of the source memory card, a mapping relationship between a system address of the source memory card and the backup memory card, and change a target memory card to which the system address of the source memory card points, to the backup memory card, so that the backup memory card may take over, in replacement of the source memory card, all read/write operations performed on the source memory card by the OS.

In this embodiment of the present invention, an acquiring unit 501 may receive a first trigger instruction; a determining unit 502 may suspend, after the acquiring unit 501 receives the first trigger instruction, a task that is being executed, to start up memory data migration, and determine a source memory card and a backup memory card; a mirroring unit 503 may set a mirror mode between the source memory card and the backup memory card, so that a migration unit 504 may instruct a memory controller associated with the source memory card to write memory data of the source memory card into the backup memory card according to the mirror mode. Therefore, the memory data of the source memory card is migrated with a computer running normally, and a problem in the prior art that the memory data migration cannot be performed is resolved, so that online maintenance can be performed on a faulty memory, to avoid replacing or maintaining a faulty memory by powering off an entire computer in the prior art. In addition, in this embodiment of the present invention, the apparatus triggers the first trigger instruction for a memory controller associated with a source memory card with a problem, to perform the memory data migration, which can ensure that a fault is rectified in time and that the memory data migration is performed only when a source memory card is faulty, thereby saving system resources.

Further, the migration unit 504 may further acquire a multiple migration policy, and instruct, according to the multiple migration policy, the memory controller associated with the source memory card to migrate the memory data of the source memory card to the backup memory card in multiple times, so that an executed task can be suspended and resumed as required during a process of performing the memory data migration, to avoid long-lime interruption to a computer service due to migration of a large volume of memory data, thereby ensuring normal running of the computer.

In addition, an error detection unit 506 may instruct the memory controller associated with the source memory card to determine non-erroneous data that is in the source memory card, so that the migration unit 504 may instruct the memory controller associated with the source memory card to migrate the non-erroneous data to the backup memory card, thereby avoiding a computer restart that may be caused by migrating erroneous data that is in the source memory card to the backup memory card.

Figure 6:
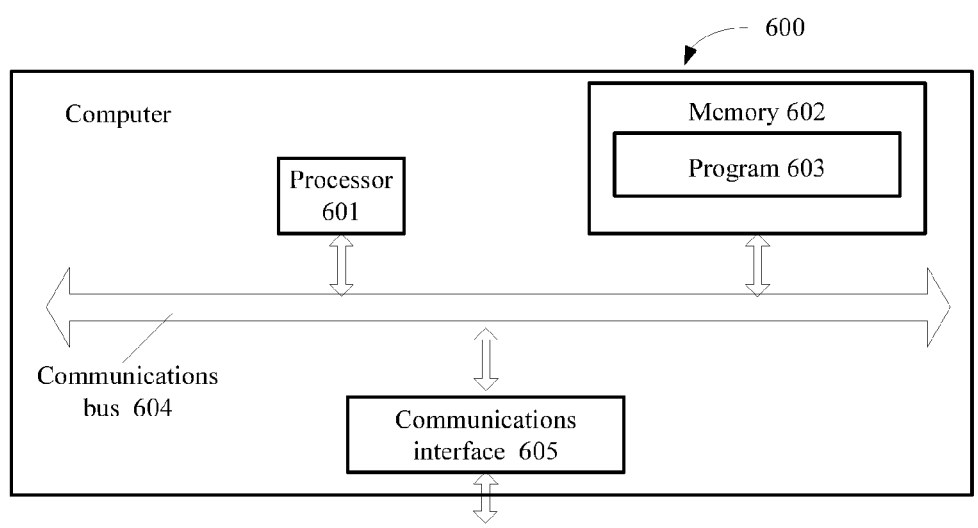
FIG. 6 is a schematic structural diagram of another memory data migration apparatus according to an embodiment of the present invention.

FIG. 6 is a schematic structural diagram of a memory data migration apparatus according to an embodiment of the present invention. The memory data migration apparatus in this embodiment of the present invention may include:

a processor 601, a memory 602, a system bus 604, and a communications interface 605, where the processor 601, the memory 602, and the communications interface 605 are connected to and communicate with each other by using the system bus 604.

The processor 601 may be a single-core or a multi-core central processing unit, or a specific integrated circuit, or may be configured as one or more integrated circuits that implement this embodiment of the present invention.

The memory 602 may be a high-speed RAM memory, or may be a non-volatile memory (non-volatile memory), for example, at least one magnetic disk memory.

The memory 602 is configured to execute a computer executable instruction 603. Specifically, the computer executable instruction 603 may include program code.

When the memory data migration apparatus runs, the processor 601 runs the computer executable instruction 603, and may execute the method procedure shown in any one of FIG. 2 to FIG. 4.

Persons of ordinary skill in the art may understand that, each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A computer, comprising:
   a processor executing instructions of an operating system of the computer;
   a primary memory coupled to the processor, configured to load the instructions of the operating system of the computer, wherein the primary memory comprises at least two memory cards including a source memory card and a backup memory card; and
   a plurality of memory controllers coupled to the processor and the primary memory, wherein each of the at least two memory cards is associated with one of the plurality of memory controllers,
   wherein the processor is configured to
   send an initialization instruction to a basic input/output system (BIOS) of the computer for instructing the BIOS to initialize the backup memory card without allocating a system address to the backup memory card,
   receive a first trigger instruction, suspend, according to the first trigger instruction, a task that is being executed, determine the source memory card having to-be-migrated memory data, determine the backup memory card for the source memory card, and instruct a memory controller associated with the source memory card to perform memory data migration, and wherein the memory controller associated with the source memory card is configured to migrate memory data from the source memory card to the backup memory card according to an instruction of the operating system, the processor is further configured to set a mirror mode between the source memory card and the backup memory card, send a data read instruction of the operating system to the memory controller associated with the source memory card, wherein the data read instruction is used to instruct the memory controller associated with the source memory card to read the memory data from the source memory card, and send a data write instruction to the memory controller associated with the source memory card, wherein the data write instruction is used to instruct the memory controller associated with the source memory card to write the read memory data back to the source memory card, wherein the memory controller associated with the source memory card is further configured to read the memory data from the source memory card according to the data read instruction of the operating system, receive the data write instruction sent by the operating system, and send the memory data read from the source memory card to a memory controller associated with the backup memory card according to the mirror mode set for the source memory card and the backup memory card, and wherein the memory controller associated with the backup memory card is configured to write the received memory data read from the source memory card into the backup memory card.

2. The computer according to claim 1, wherein the memory controller associated with the source memory card is further configured to monitor erroneous data stored in the source memory card, and the memory controller associated with the source memory card triggers the first trigger instruction if a volume of the erroneous data exceeds a threshold, and wherein the operating system is further configured to receive the first trigger instruction triggered by the memory controller associated with the source memory card.

3. The computer according to claim 2, wherein the memory controller associated with the source memory card is further configured to record, in a register of the memory controller associated with the source memory card, that the volume of the erroneous data stored in the source memory card exceeds the threshold, and wherein the operating system is further configured to search the register of the memory controller associated with the source memory card, in order to determine the source memory card.

4. The computer according to claim 2, wherein the operating system is further configured to determine the backup memory card according to a pre-configured identifier of the backup memory card.

5. The computer according to claim 1, wherein the operating system is further configured to configure a startup policy for the memory data migration, or receive a startup instruction for the memory data migration sent by a user, and the operating system generates the first trigger instruction according to the startup policy or the startup instruction.

6. The computer according to claim 5, wherein the startup policy or the startup instruction further comprises an identifier of the source memory card, wherein the operating system is further configured to record, in a storage module, the identifier of the source memory card, and the operating system is further configured to search the storage module, to determine the identifier of the source memory card.

7. The computer according to claim 1, wherein the operating system is further configured to determine whether the backup memory card meets a migration condition, and if the backup memory card meets the migration condition, instruct the memory controller associated with the source memory card to perform the memory data migration, and wherein the migration condition comprises one or any combination of following conditions: the backup memory card has been completely initialized, and a memory capacity of the backup memory card is greater than or equal to a memory capacity of the source memory card.

8. The computer according to claim 1, wherein the operating system is further configured to instruct the memory controller associated with the source memory card to detect non-erroneous data in the source memory card, wherein the memory controller associated with the source memory card is further configured to determine, according to a detection instruction of the operating system, the non-erroneous data in the source memory card, and make a detection mark according to a detection result, and wherein the operating system is further configured to instruct the memory controller associated with the source memory card to migrate the non-erroneous data according to the detection mark.

9. The computer according to claim 1, wherein the operating system is further configured to change a target memory card to which a system address of the source memory card points, to the backup memory card after the operation system determines that all memory data in the source memory card is migrated to the backup memory card.

10. A memory data migration method, used to migrate memory data stored in a computer, wherein the computer comprises a primary memory and a processor coupled to the primary memory, the primary memory comprises at least two memory cards including a source memory card and a backup memory card, the method comprises:

instructing, by the processor, a basic input/output system (BIOS) of the computer to initialize the backup memory card, wherein the initialization avoids allocating a system address to the backup memory card;

acquiring, by the processor, a first trigger instruction, wherein the first trigger instruction is used to instruct the processor to execute memory data migration;

suspending, by the processor, a task that is being executed, to start the memory data migration;

determining, by the processor, the source memory card having to-be-migrated memory data;

determining, by the processor, the backup memory card for the source memory card;

setting, by the processor, a mirror mode between the source memory card and the backup memory card;

sending, by the processor, a data read instruction to the memory controller associated with the source memory card, wherein the data read instruction is used to instruct the memory controller associated with the source memory card to read the memory data stored in the source memory card;

reading, by the memory controller associated with the source memory card, the memory data stored in the source memory card according to the data read instruction;

sending, by the processor, a data write instruction to the memory controller associated with the source memory card, wherein the data write instruction is used to instruct the memory controller associated with the source memory card to write the read data back to the source memory card; and receiving, by the memory controller associated with the source memory card, the data write instruction sent by the operating system, and sending the memory data read from the source memory card to a memory controller associated with the backup memory card according to the mirror mode set between the source memory card and the backup memory card, so that the memory controller associated with the backup memory card writes the memory data received from the source memory card into the backup memory card.

11. The method according to claim 10, further comprising:

monitoring, by the memory controller associated with the source memory card, erroneous data in the source memory card, and triggering, by the memory controller associated with the source memory card, the first trigger instruction if a volume of the erroneous data exceeds a threshold; and receiving, by the operating system, the first trigger instruction triggered by the memory controller associated with the source memory card.

12. The method according to claim 11, further comprising:

recording, by the memory controller associated with the source memory card, in a register of the memory controller associated with the source memory card, that the volume of the erroneous data in the source memory card exceeds the threshold, and wherein the determining, by the operating system, the source memory card comprises:

searching, by the operating system, the register of the memory controller associated with the source memory card, and determining the source memory card.

13. The method according to claim 11, further comprising:

recording a pre-configured identifier of the backup memory card, and wherein the determining, by the operating system, a backup memory card comprises:

determining, by the operating system, the backup memory card according to the recorded identifier of the backup memory card.

14. The method according to claim 10, wherein the acquiring, by an operating system, a first trigger instruction comprises:

generating, by the operating system, the first trigger instruction according to a pre-configured startup policy of the memory data migration or a startup instruction of the memory data migration sent by a user.

15. The method according to claim 14, further comprising:

acquiring and recording, by the operating system, an identifier of the source memory card comprised in the startup policy or the startup instruction, and wherein the determining, by the operating system, a source memory card comprises:

determining, by the operating system, the source memory card according to the recorded identifier of the source memory card.

16. The method according to claim 10, wherein before the instructing, by the operating system, a memory controller associated with the source memory card to perform the memory data migration, the method further comprises:

determining, by the operating system, whether the backup memory card meets a migration condition, and if the backup memory card meets the migration condition, instructing the memory controller associated with the source memory card to perform the memory data migration, wherein the migration condition comprises but is not limited to one or any combination of following conditions: the backup memory card has been completely initialized, and a memory capacity of the backup memory card is greater than or equal to a memory capacity of the source memory card.

17. The method according to claim 10, wherein before the instructing, by the operating system, a memory controller associated with the source memory card to perform the memory data migration, the method further comprises:

instructing, by the operating system, the memory controller associated with the source memory card to detect non-erroneous data in the source memory card, and performing marking; and instructing, by the operating system, the memory controller associated with the source memory card to migrate the non-erroneous data according to a detection mark.

18. The method according to claim 10, wherein after all memory data stored in the source memory card is migrated to the backup memory card, the method further comprises:

changing, by the operating system, a target memory card to which a system address of the source memory card points, to the backup memory card.

19. A non-transitory computer readable medium storing computer instructions, that when executed by one or more processors, cause the one or more processors to perform the operations of:

instructing a basic input/output system (BIOS) of the computer to initialize a backup memory card, wherein the initialization avoids allocating a system address to the backup memory card;

acquiring a first trigger instruction, wherein the first trigger instruction is used to instruct the operating system to execute memory data migration;

suspending a task that is being executed to start up the memory data migration;

determining a source memory card having to-be-migrated memory data;

determining the backup memory card for the source memory card;

setting a mirror mode between the source memory card and the backup memory card;

sending a data read instruction to the memory controller associated with the source memory card, wherein the data read instruction is used to instruct the memory controller associated with the source memory card to read the memory data stored in the source memory card;

reading the memory data stored in the source memory card via the memory controller associated with the source memory card;

sending a data write instruction to the memory controller associated with the source memory card, wherein the data write instruction is used to instruct the memory controller associated with the source memory card to write the read data back to the source memory card; and receiving the data write instruction via the memory controller associated with the source memory card, and sending the memory data read from the source memory card to a memory controller associated with the backup memory card according to the mirror mode set between the source memory card and the backup memory card, so that the memory controller associated with the backup memory card writes the memory data received from the source memory card into the backup memory card.

\* \* \* \* \*